(12) United States Patent
Ding et al.

(10) Patent No.: US 11,347,923 B1
(45) Date of Patent: May 31, 2022

(54) BUFFERING ALGORITHM WITH MAXIMUM COST CONSTRAINT

(71) Applicant: Cadence Design Systems, Inc., San Jose, CA (US)

(72) Inventors: Yi-Xiao Ding, Austin, TX (US); Zhuo Li, Austin, TX (US); Jhih-Rong Gao, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/219,737

(22) Filed: Mar. 31, 2021

(51) Int. Cl.
*G06F 30/392* (2020.01)
*G06F 117/10* (2020.01)
*G06F 111/04* (2020.01)

(52) U.S. Cl.
CPC ........ *G06F 30/392* (2020.01); *G06F 2111/04* (2020.01); *G06F 2117/10* (2020.01)

(58) Field of Classification Search
USPC ........................................................ 716/100
See application file for complete search history.

(56) References Cited

U.S. PATENT DOCUMENTS

| | | | |
|---|---|---|---|
| 2007/0234266 A1* | 10/2007 | Chen | G06F 30/34 716/133 |
| 2014/0366069 A1* | 12/2014 | Ramamurthi | H04W 36/24 725/62 |
| 2020/0267434 A1* | 8/2020 | Sanghavi | H04N 21/6581 |
| 2021/0160548 A1* | 5/2021 | Ziskind | H04N 21/631 |

* cited by examiner

*Primary Examiner* — Mohammed Alam
(74) *Attorney, Agent, or Firm* — Schwegman Lundberg & Woessner, P.A.

(57) ABSTRACT

An integrated circuit (IC) design is accessed from a database in memory. The IC design comprises an initial buffer tree for a net in the IC design. A maximum cost constraint for rebuffering the net is determined based on the initial buffer tree. A partial rebuffering solution is generated for net and a cost associated with the partial rebuffering solution is determined. Based on determining the cost of the partial rebuffering solution satisfies the maximum cost constraint, the partial rebuffering solution is saved in a set of partial rebuffering solutions for the net. A set of candidate rebuffering solutions for the net is generated based on the set of partial rebuffering solutions, and a rebuffering solution for the net is selected from the set of candidate rebuffering solutions. The database is updated to replace the initial buffer tree in the IC design with the rebuffering solution selected for the net.

20 Claims, 5 Drawing Sheets

US 11,347,923 B1

BUFFERING ALGORITHM WITH MAXIMUM COST CONSTRAINT

TECHNICAL FIELD

The present disclosure generally relates to the technical field of integrated circuit (IC) design. In particular, the present disclosure addresses systems and methods for performing rebuffering of an IC design using a maximum cost constraint.

BACKGROUND

An IC comprises cells of similar and/or various sizes and connections between or among the cells. A cell comprises one or more circuit elements such as transistors, resistors, capacitors, inductors, and other basic circuit elements grouped together to perform a logic function. Each cell includes multiple pins interconnected by wires to pins of one or more other cells. A net includes a set of pins connected by wires in order to form connections between or among the pins. An IC design may include multiple nets. A design netlist specifies the connections between the pins.

Design engineers design ICs by transforming circuit descriptions of the ICs into geometric descriptions, called layouts. To create layouts, design engineers typically use electronic design automation (EDA) applications. These applications provide sets of computer-based tools for creating, editing, and analyzing IC design layouts.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
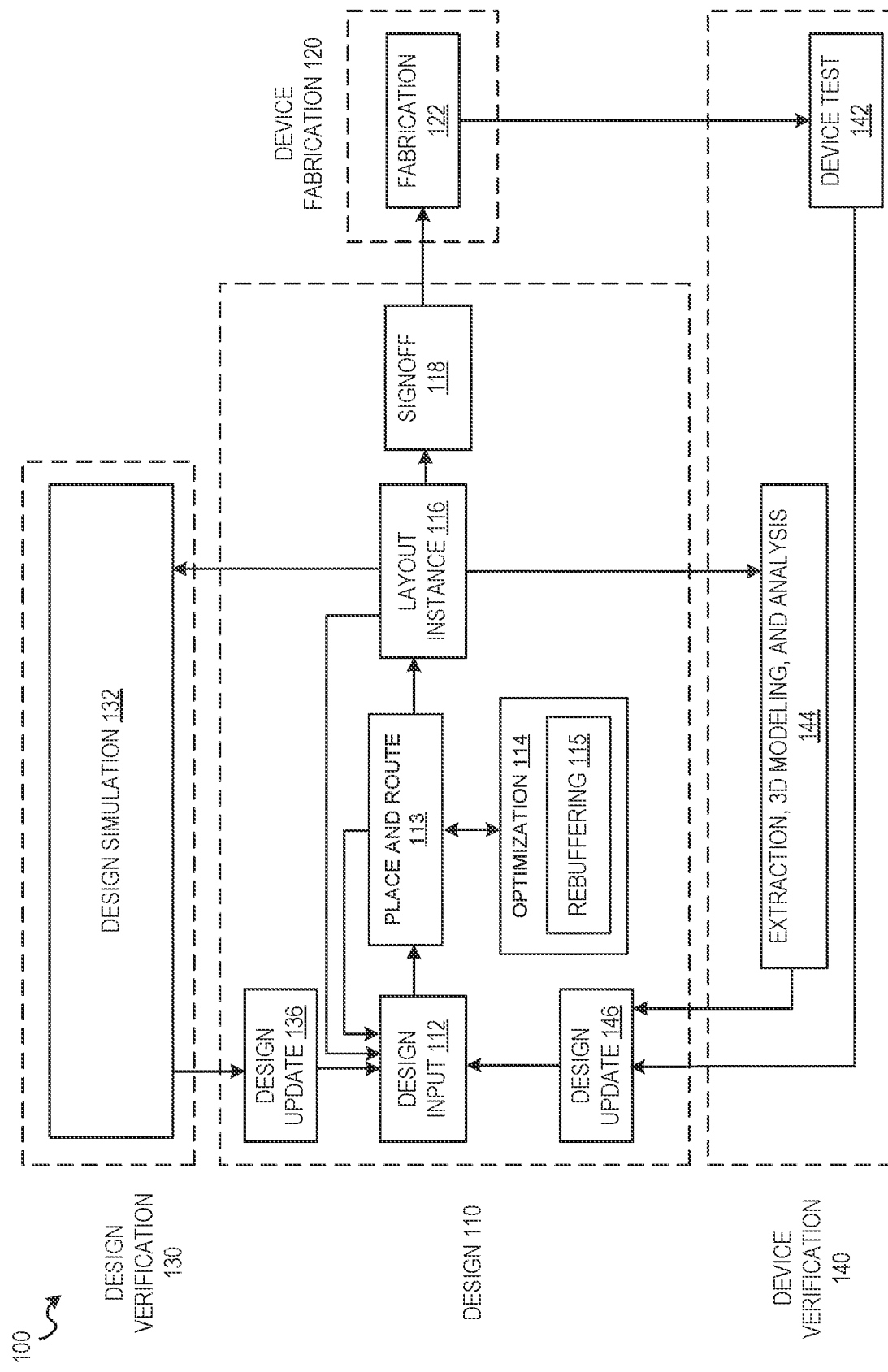
FIG. 1 is a diagram illustrating an example IC design process flow that includes a method of rebuffering using a maximum cost constraint, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

In addition to circuit partitioning, floor planning, placement, and routing, a typical EDA IC design process may include one or more optimization operations during which design objectives such as slew, timing, power, and other considerations are improved. Optimization often involves rebuffering. Rebuffering involves replacing buffers and inverters with other buffers or inverters of various sizes or locations to optimize design objectives. As an example, an existing buffer set may be partially removed and a new buffer set may be inserted into a design during an optimization operation. Generally, rebuffering optimizations often include evaluating multiple rebuffering solutions (e.g., multiple buffer trees) using a scoring algorithm, such as a return on investment (ROI) algorithm, that indicates a measure of improvement provided by each rebuffering solution. Conventional scoring algorithms calculate a cost associated with each rebuffering solution based on slew, timing, power, or a combination thereof and use these costs as a basis for evaluating the improvement provided by each rebuffering solution. Traditional rebuffering optimizations produce numerous rebuffering solutions that require substantial processing resources to evaluate, which can hinder the run-time of such processing.

Aspects of the present disclosure address problems with slow run-time of conventional approaches to rebuffering in EDA, among others, with a design process that includes performing rebuffering using a maximum cost constraint. In an example, an EDA system (e.g., a computing device executing EDA software) accesses a database that includes data describing an IC design that includes an initial buffer tree for a net. The initial buffer tree comprises a source, a sink, and at least one buffer cell connected in between the source and the sink. The EDA determines a maximum cost constraint for rebuffering the net based on a calculated cost associated with the initial buffer tree (e.g., based on an area consumed by buffer (or inverter) cells in the initial buffer tree, leakage current associated with the buffer (or inverter) cells in the initial buffer tree, and a total dynamic power of the initial buffer tree).

After removing buffer cells in the initial buffer tree, the EDA system generates rebuffering candidate solutions for the net in a bottom-up manner from sink to source. During this process, buffer (or inverter) cells are placed at bufferable locations along a route that connects the sink to the source. As the EDA system moves from the sink to the source, a set of partial rebuffering solutions are generated at each bufferable location. At each subsequent bufferable location, partial rebuffering solutions are generated based on partial solutions from prior bufferable locations until the set of rebuffering candidate solutions are generated at the last remaining bufferable location before the source.

The EDA system computes a cost for each partial rebuffering solution that is generated and determines whether the cost satisfies the cost constraint. If the cost of a partial rebuffering solution violates the cost constraint, the EDA system discards the partial rebuffering solution so that it is not used in generating further rebuffering candidate solutions. In doing so, the EDA system reduces the amount of processing necessary to generate a set of complete rebuffering candidate solutions from which a rebuffering solution for the net can be selected. If the cost of the partial rebuffering solution satisfies the cost constraint, the EDA system saves the partial rebuffering solution and propagates it to generate further rebuffering candidate solutions. Once a set of complete candidate rebuffering solutions is generated, the EDA system selects one as the rebuffering solution for the net and uses it to update the IC design in the database.

FIG. 1 is a diagram illustrating an example design process flow 100 of an EDA system that includes a minimum-area layer assignment process to improve timing in an IC design, according to some embodiments. As shown, the design process flow 100 of the EDA system includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, placement, and timing analysis are performed in a place and route 113 operation, and optimization is performed in a optimization 114 operation along with any other automated design processes. While the design process flow 100 shows place and route 113 and optimization 114 occurring prior to a layout instance 116, routing, placement, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the optimization 114 operation includes a rebuffering 115 operation performed by the EDA system. The rebuffering 115 operation includes generating and evaluating multiple rebuffering candidate solutions for a net to replace an initial buffer tree generated for the net. A maximum cost constraint for rebuffering the net is determined by the EDA system based on a calculated cost associated with the initial buffer tree. After removing buffer cells in the initial buffer tree, the EDA system generates rebuffering candidate solutions for the net in a bottom-up manner from sink to source. As the EDA system moves from the sink to the source, a set of partial rebuffering solutions are generated at each bufferable location along a route that connects the source to the sink. At each subsequent bufferable location, partial rebuffering solutions are generated by the EDA system based on partial solutions from prior bufferable locations until the set of rebuffering candidate solutions are generated at the last remaining bufferable location before the source.

A cost for each partial rebuffering solution that is generated is determined and evaluated in view of the cost constraint. If the cost of a partial rebuffering solution violates the cost constraint, the EDA system discards the partial rebuffering solution so that it is not used in generating further rebuffering candidate solutions, thereby reducing the amount of processing necessary to generate a set of complete rebuffering candidate solutions. If the cost of the partial rebuffering solution satisfies the cost constraint, the EDA system saves the partial rebuffering solution and propagates it through to further rebuffering candidate solutions. Once a set of complete candidate rebuffering solutions is generated, the EDA system selects one as the rebuffering solution for the net and uses it to update the IC design.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations, and layout modifications can be generated based on actual device performance.

A design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
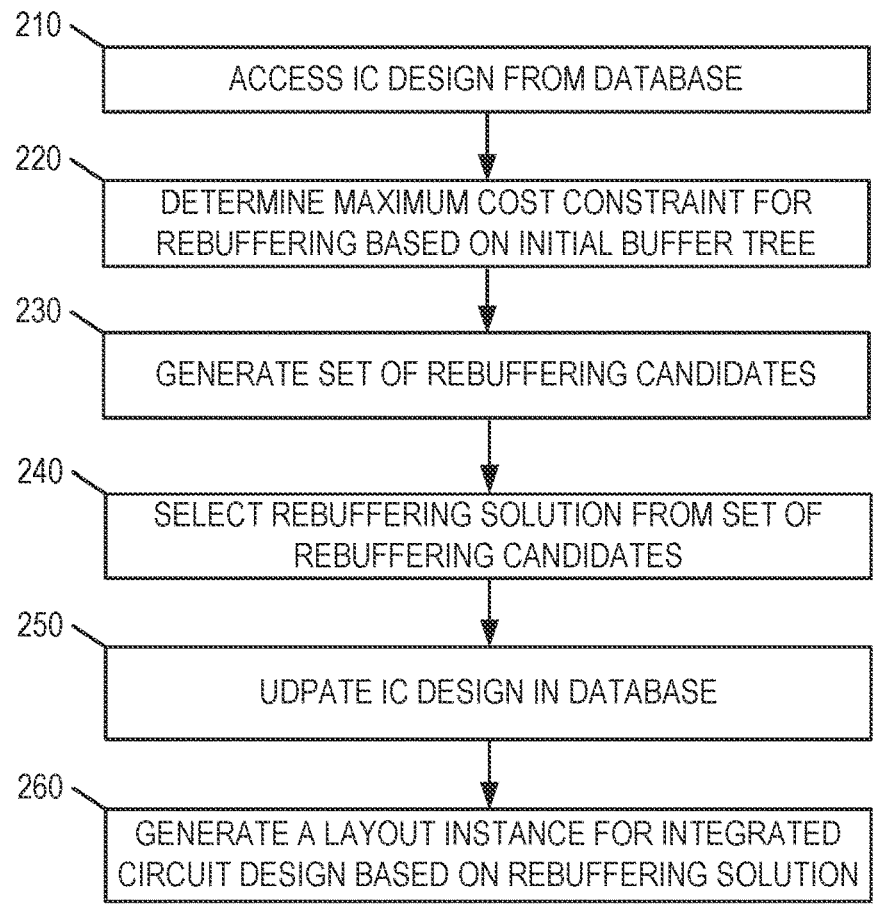
FIGS. 2 and 3 are flowcharts illustrating operations of a method for rebuffering an IC design using a maximum cost constraint, according to some embodiments.
Figure 3:
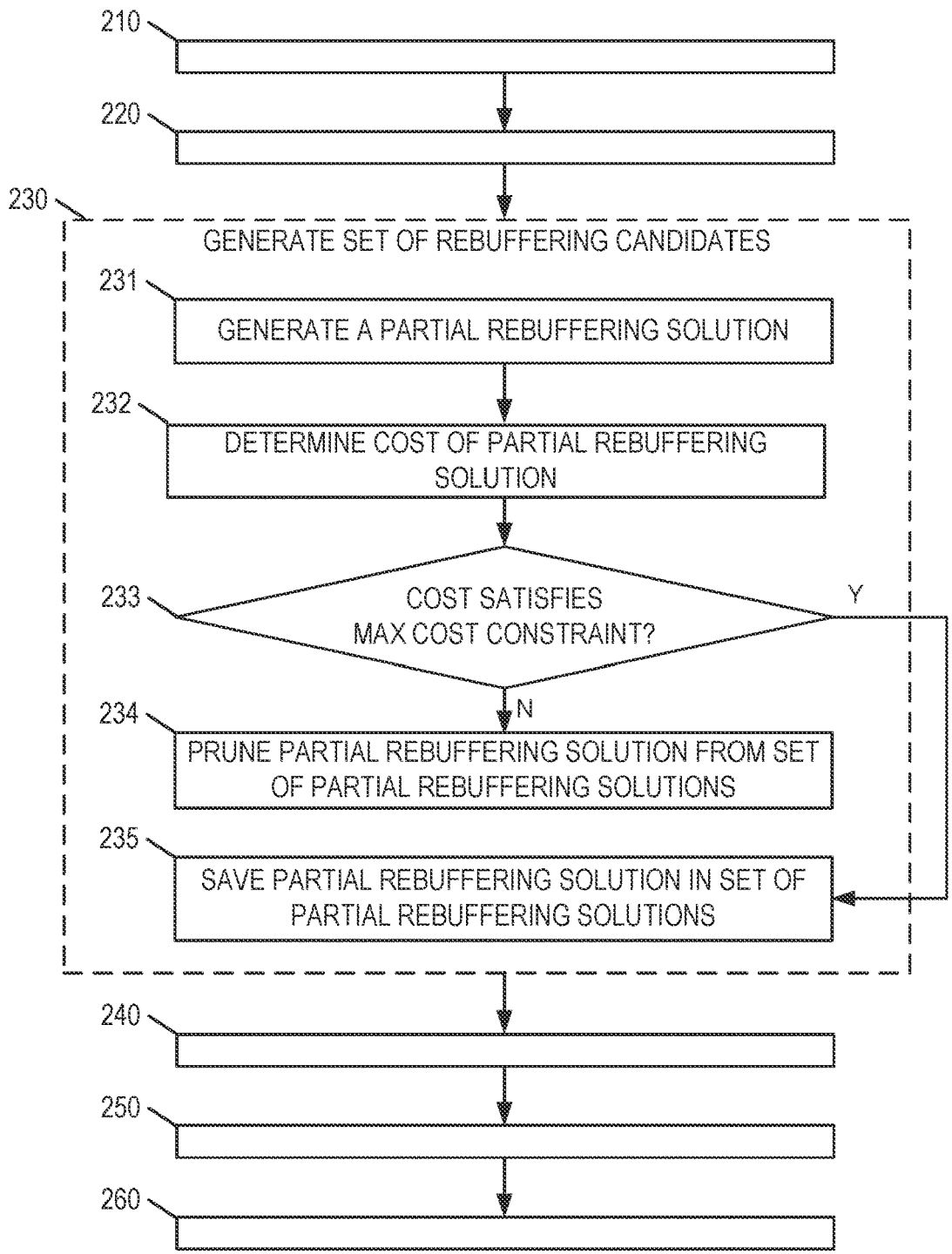

FIGS. 2 and 3 are flowcharts illustrating operations of a method 200 for rebuffering in an IC design using a maximum cost constraint, according to some embodiments. For some embodiments, the method 200 is performed as part of a place and route process applied to a circuit design (e.g., by an EDA system).

It will be understood that the method 200 may be performed by a computing device, such as a computing device executing instructions of an EDA system. For example, the operations of a method 200 may be represented by executable instructions (e.g., EDA software) that, when executed by a processor of a computing device, cause the computing device to perform the method 200. Thus, an operation of the method 200 may be performed by one or more processors (e.g., central processing unit or graphics processing unit) of at least one computing device (e.g., desktop, server, etc.). Thus, the method 200 is describe below in relation to such a computing device. However, the one or more processors may also operate to support performance of the relevant operations in a "cloud computing" environment or as a "software as a service" (SaaS). For example, at least some of the operations may be performed by a group of computing devices (as examples of machines including processors), with these operations being accessible via a network (e.g., the Internet) and via one or more appropriate interfaces (e.g., an API).

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

At operation 210, the computing device accesses an IC design comprising an initial buffer tree for a net in the design that includes a route connecting a source to a sink. The IC design can be accessed from a database in memory. The initial buffer tree comprises the source, the sink, and one or more buffers (or inverters) placed along the route that connects the source to the sink. The IC design can further specify bufferable locations along the route that connects the sink to the source.

At operation 220, the computing device determines a maximum cost constraint for rebuffering the net. The maximum cost constraint defines a cost threshold for rebuffering the net. The cost threshold is determined based on a cost associated with the initial buffer tree. The computing device can determine the cost associated with the initial buffer tree based on an area consumed by buffer (or inverter) cells in the initial buffer tree, leakage current associated with the buffer (or inverter) cells in the initial buffer tree, and a total dynamic power of the initial buffer tree. As an example, the computing device can determine the cost associated with the initial buffer tree as follows:

$$\text{Cost} = A * \left(\frac{\text{Area}}{\text{Unit Area}}\right) + B * \left(\frac{\text{leakage current}}{\text{unit current}}\right) + C * \left(\text{Dynamic}\frac{\text{Power}}{\text{unit power}}\right)$$

Where A, B, and C are configurable parameters. In some embodiments, the computing device can use a total capacitance of the initial buffer tree as the dynamic power of the initial buffer tree.

The computing device, at operation 230, generates multiple rebuffering candidate solutions based on the net. Each rebuffering candidate solution comprises a modified buffer tree based on the net. After removing any buffer (or inverter) cells in the initial buffer tree, the computing device generates rebuffering candidate solutions in a bottom-up manner from sink to source. During this process, buffer (or inverter) cells are placed at bufferable locations along a route that connects the sink to the source. As the computing device moves from the sink to the source, a set of partial rebuffering solutions are generated at each bufferable location. At each subsequent bufferable location, partial rebuffering solutions are generated based on partial solutions from prior bufferable locations until the set of rebuffering candidate solutions are generated at the final remaining bufferable location.

As shown in FIG. 3, operations 231, 232, 233, 234, and 235 can be performed as part of operation 230 and can be repeated multiple times in generating the set of rebuffering candidate solutions. At operation 231, the computing device generates a partial rebuffering solution. Initially, the computing device generates a partial rebuffering solution by inserting a buffer (or inverter) cell at an initial bufferable location on a route connecting a sink to a source after buffer (or inverter) cells from the initial buffer tree have been removed. In subsequent iterations, the computing device generates a partial rebuffering solution by inserting a buffer (or inverter) cell at a subsequent bufferable location in a prior generated partial rebuffering solution.

The computing device determines a cost associated with the partial rebuffering solution, at operation 232. Similar to the cost associated with the initial buffer tree, the computing device can determine the cost associated with the partial rebuffering solution based on an area consumed by buffer (or inverter) cells in the initial buffer tree, leakage current associated with the buffer (or inverter) cells in the initial buffer tree, and a total dynamic power of the initial buffer tree. Accordingly, the computing device can determine the cost associated with the partial rebuffering solution in the manner described above in reference to the initial buffer tree.

At operation 233, the computing device determines whether the cost associated with the partial rebuffering solution satisfies the maximum cost constraint. The computing device determines whether the cost satisfies the maximum cost constraint by comparing the cost to the cost threshold defined by the maximum cost constraint. If the cost exceeds the threshold, the cost violates the maximum cost constraint and the computing device prunes the partial rebuffering solution from a set of partial rebuffering solutions, at operation 234. In this way, the partial rebuffering solution is not used in subsequent iterations of operation 231 to generate the set of rebuffering candidate solutions.

If the cost does not exceed the threshold, the cost satisfies the maximum cost constraint and the computing device saves the partial rebuffering solution in the set of partial rebuffering solutions, at operation 235. Because the partial rebuffering solution is saved, the computing device can use the partial rebuffering solution in subsequent iterations of operation 231 involved in generating the set of rebuffing candidates.

At operation 240, the computing device selects a rebuffering solution for the net from the set of rebuffering candidate solutions. That is, the computing device selects one of the rebuffering candidate solutions as the rebuffering solution for the net. In doing so, the computing device selects a new buffer tree from the rebuffering candidate solutions to replace the initial buffer tree. In an example, the computing device can calculate an improvement score for each rebuffering candidate solution (e.g., based on a return on investment calculated based on the costs of the initial buffer tree and rebuffering candidate solution) and select the rebuffering candidate solution based on the improvement score. The computing device updates the database based on the selected rebuffering solution, at operation 250. In doing so, the computing device updates the database to replace the initial buffer tree om the IC design with the new buffer tree from the selected rebuffering solution.

The computing device, at operation 260, generates a design layout instance for the IC device design based in part on the selected rebuffering solution for the net. The layout describes the physical layout dimensions of the IC device.

Figure 4:
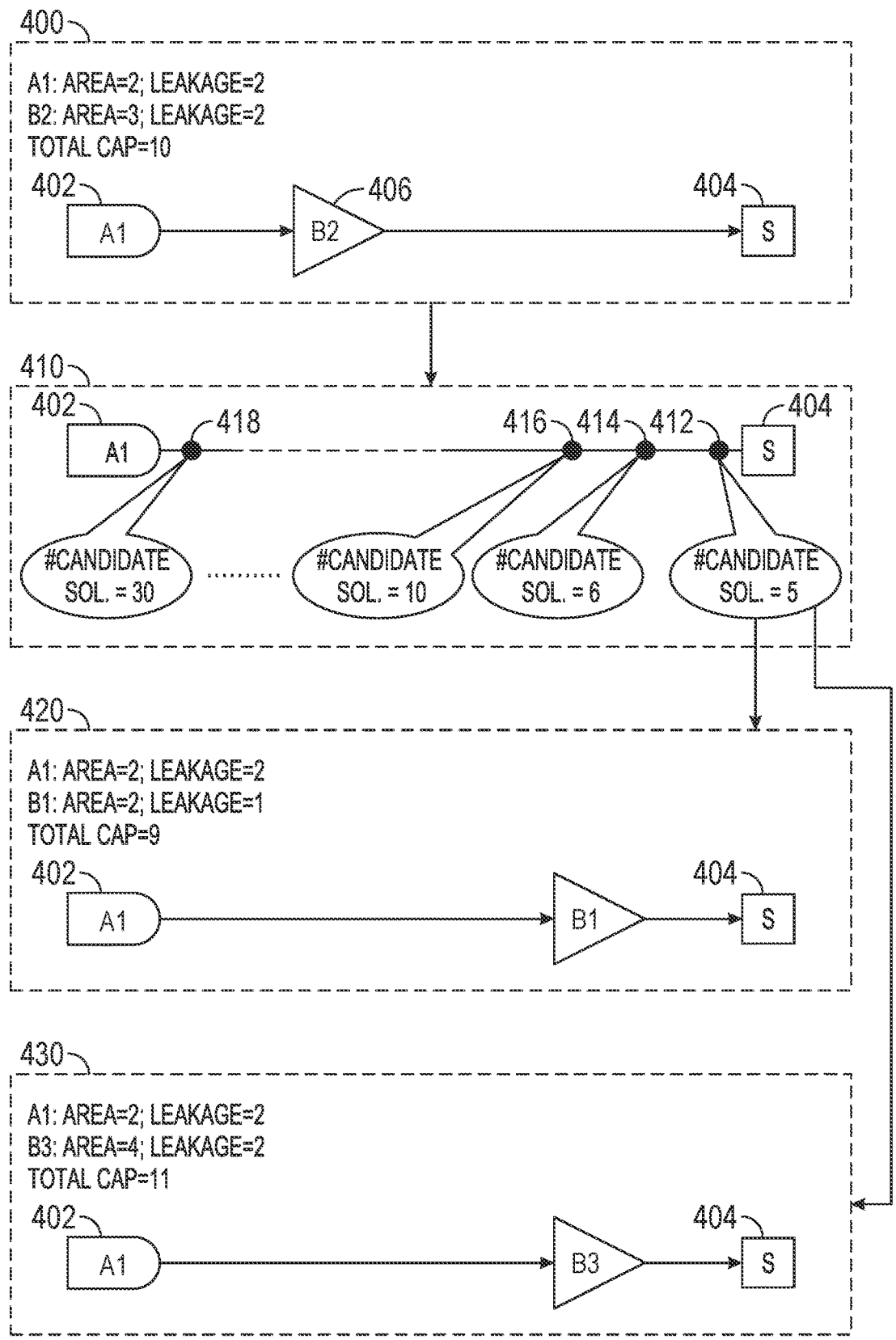
FIG. 4. is a conceptual diagram illustrating a method of rebuffering in an IC design using a maximum cost constraint, according to some embodiments.

FIG. 4. is a conceptual diagram illustrating a method of rebuffering in an IC design using a maximum cost constraint, according to some embodiments. An initial buffer tree 400 for a net in an IC design is shown. The initial buffer tree 400 include source 402, sink 404, and buffer 406. In rebuffering the net in accordance with method described herein, an EDA system in the example form of a computing device determines a maximum cost constraint based on the initial buffer tree 400. The computing device determines the maximum cost constraint by calculating a cost associated with the initial buffer tree 400 based on an area consumed by the source 402 and buffer 406, leakage current associated with the source 402 and buffer 406, and a total dynamic power of the initial buffer tree 400 using a total capacitance of the initial buffer tree 400. Using the example values for area, leakage current, and total capacitance provided for the initial buffer tree 400, the computing device calculates the cost for the initial buffer tree 400 as follows:

$$\text{Cost}_{400} = (2+3)+(2+2)+10=19$$

Hence, in this example, the maximum cost constraint is 19.

As shown at box 410, the computing device generates multiple rebuffering candidate solutions for the net. After removing the buffer 406 from the initial buffer tree 400, the computing device generates rebuffering candidate solutions in a bottom-up manner from the sink 404 to the source 402.

During this process, buffer (or inverter) cells are placed at bufferable locations along the route that connects the sink 404 to the source 402. As the computing device moves from the sink 404 to the source 402, a set of partial rebuffering solutions are generated at each bufferable location. At each subsequent bufferable location, partial rebuffering solutions are generated based on partial solutions from prior bufferable locations until the set of rebuffering candidate solutions are generated at the final remaining bufferable location.

As an example, bufferable locations 412, 414, 416 and 418 are shown on the route that connects the sink 404 to the source 402. Initially, the computing device can generate a set of partial rebuffering solutions for the net by placing various buffer (or inverter) cells at the location 412. After generating the partial rebuffering solutions at location 412, the computing device can grow the set of partial rebuffering solutions by inserting various additional buffer (or inverter) cells at location 414. That is, for each partial rebuffering solution generated at location 414, the computing device can generate additional partial rebuffering solutions by inserting buffer (or inverter) cells at location 414. This process is repeated until the computing device reaches the location 418 (the last bufferable location prior to the source 402), at which point a set of (full) rebuffering candidate solutions are generated.

As partial rebuffering solutions are generated, the computing device calculates the costs associated with each in the same manner described above in reference to the initial buffer tree 400, and if the cost associated with a partial rebuffering solution violates the maximum cost constraint (e.g., if the cost exceeds the cost of the initial buffer tree 400), the partial rebuffering solution is pruned from the set of partial rebuffering solutions and therefore not used to generate further rebuffering candidate solutions, whether partial or complete. Otherwise, the partial rebuffering solution is saved and used to generate further rebuffering candidate solutions for the net.

As an example of the foregoing, FIG. 4 illustrates partial rebuffering solutions 420 and 430, both of which are generated by inserting a buffer cell at location 412, though different buffer cells are used in each candidate. Using the example values for area, leakage current, and total capacitance provided for partial rebuffering solution 420, the computing device calculates the cost for partial rebuffering solution 420 as follows:

$$Cost_{420}=(2+2)+(2+1)+9=16$$

Using the values for area, leakage current, and total capacitance provided for partial rebuffering solution 430, the computing device calculates the cost for partial rebuffering solution 430 as follows:

$$Cost_{430}=(2+4)+(2+2)+11=21$$

Because the cost of the partial rebuffering solution 420 is below the cost threshold set forth by the maximum cost constraint (16<19), the partial rebuffering solution 420 is saved and used in subsequent iterations to generate further partial rebuffering solutions by inserting additional buffer (or inverter) cells at location 414. Because the cost of the partial rebuffering solution 430 exceeds the cost threshold set forth by maximum cost constraint (21>19), the partial rebuffering solution 430 is pruned, and thus not used in building further partial rebuffering solutions at location 414.

Figure 5:
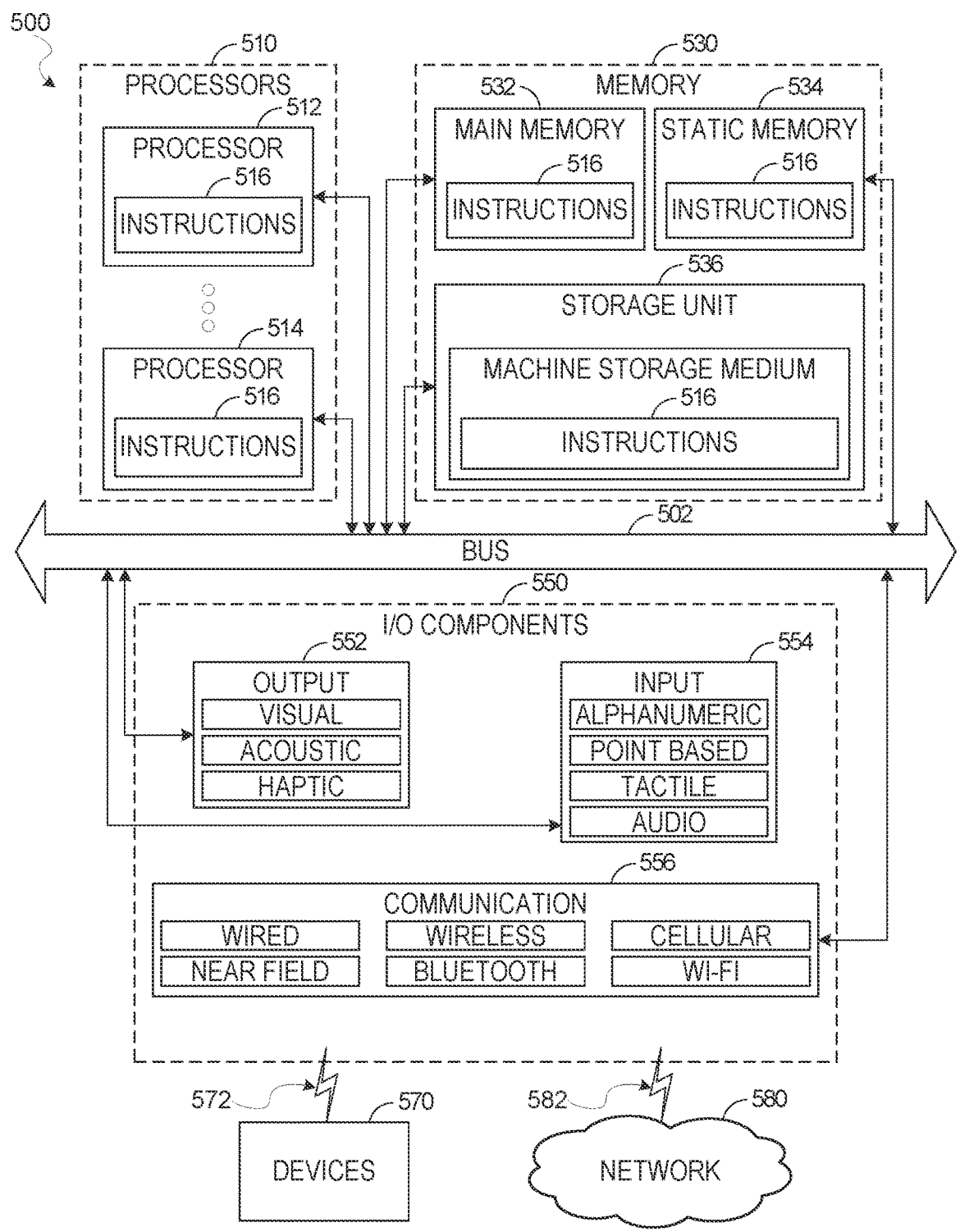
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may correspond to EDA software that transforms the machine 500 into an EDA system that executes the method 200. Additionally, or alternatively, the instructions 516 may implement FIGS. 1 and 5. The instructions 516 transform the general, non-programmed machine 500 into a particular machine 500, such as an EDA system, programmed to carry out the described and illustrated functions in the manner described here. In alternative embodiments, the machine 500 operates as a standalone device or may be coupled (e.g., networked) to other machines.

In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, both accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 556 operable to couple the machine 500 to a network 580 or devices 570 via a coupling 582 and a coupling 572, respectively. For example, the communication components 556 may include a network interface component or another suitable device to interface with the network 580. In further examples, the communication components 556 may include wired communication components, wireless communication components, cellular communication components, and other communication components to provide communication via other modalities. The devices 570 may be another machine or any of a wide variety of peripheral devices (e.g., a peripheral device coupled via a universal serial bus (USB)).

Executable Instructions and Machine Storage Medium

The various memories (e.g., 530, 532, 534, and/or memory of the processor(s) 510) and/or the storage unit 536 may store one or more sets of instructions and data structures (e.g., software) embodying or utilized by any one or more of the methodologies or functions described herein. These instructions, when executed by the processor(s) 510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks, magneto-optical disks, and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 556) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended: that is, a system, device, article, or process that includes elements in addition to those listed after such a term in a claim is still deemed to fall within the scope of that claim.

What is claimed is:

1. An electronic design automation (EDA) system comprising:
   one or more processors of a machine; and
   a computer-storage medium storing instructions, which when executed by the machine, cause the machine to perform operations comprising:
   accessing an integrated circuit (IC) design comprising an initial buffer tree for a net in the IC design;
   determining a maximum cost constraint for rebuffering the net based on the initial buffer tree;
   generating a partial rebuffering solution for net;
   determining a cost of the partial rebuffering solution;
   determining the cost of the partial rebuffering solution satisfies the maximum cost constraint;
   based on determining the cost of the partial rebuffering solution satisfies the maximum cost constraint, saving the partial rebuffering solution in a set of partial rebuffering solutions for the net;
   generating a set of candidate rebuffering solutions for the net based on the set of partial rebuffering solutions;
   selecting a rebuffering solution for the net from the set of candidate rebuffering solutions; and
   updating the IC design to replace the initial buffer tree in the IC design with the rebuffering solution selected for the net.

2. The EDA system of claim 1, wherein:
the partial rebuffering solution is a first partial rebuffering solution; and
the operations further comprise:
generating a second rebuffering solution for the initial buffer tree;
determining a cost of the second partial rebuffering solution;
   determining the cost of the second partial rebuffering solution violates the maximum cost constraint; and
   based on determining the cost of the second partial rebuffering solution violates the maximum cost constraint, pruning the second partial rebuffering solution from the set of partial rebuffering solutions.

3. The EDA system of claim 2, wherein:
generating the second partial rebuffering solution comprises inserting a buffer or inverter cell at a bufferable location within the first partial rebuffering solution.

4. The EDA system of claim 1, wherein:
the net comprises a route that connects a source to a sink; and
generating a partial rebuffering solution for the net comprises:
   inserting a buffer or inverter cell at a bufferable location along the route that connects the source to the sink in the net.

5. The EDA system of claim 1, wherein determining the maximum cost constraint for rebuffering the initial buffer tree comprises determining a cost associated with the initial buffer tree.

6. The EDA system of claim 1, wherein:
the maximum cost constraint comprises a cost threshold; and
determining the cost of the partial rebuffering solution satisfies the maximum cost constraint comprises:
comparing the cost of the partial rebuffering solution to the cost threshold; and
determining the cost of the partial rebuffering solution does not exceed the cost threshold.

7. The EDA system of claim 5, wherein:
determining the cost of the initial buffer tree is based on an area consumed by cells in the initial buffer tree, leakage current associated with the cells in the initial buffer tree, and a total dynamic power of the initial buffer tree; and
determining the cost of the partial rebuffering solution is based on an area consumed by cells in the partial rebuffering solution, leakage current associated with the cells in the partial rebuffering solution, and a total dynamic power of the partial rebuffering solution.

8. The EDA system of claim 5, wherein:
determining the cost of the initial buffer tree comprises calculating a sum of: an area consumed by cells in the initial buffer tree, leakage current associated with the cells in the initial buffer tree, and a total capacitance of the initial buffer tree; and
determining the cost of the partial rebuffering solution comprises calculating a sum of: an area consumed by cells in the partial rebuffering solution, leakage current associated with the cells in the partial rebuffering solution, and a total capacitance of the partial rebuffering solution.

9. The EDA system of claim 1, wherein the operations further comprise:
generating a layout instance based on the rebuffering solution selected for the net.

10. A computer-storage medium storing instructions, which when executed by a machine, cause the machine to perform operations comprising:
accessing an integrated circuit (IC) design comprising an initial buffer tree for a net in the IC design;
determining, by one or more processors, a maximum cost constraint for rebuffering the net based on the initial buffer tree, the maximum cost constraint defining a cost threshold for rebuffering the net;
generating, by the one or more processors, a partial rebuffering solution for net;
determining, by the one or more processors, a cost of the partial rebuffering solution;
determining, by the one or more processors, the cost of the partial rebuffering solution does not exceed the cost threshold;
based on determining the cost of the partial rebuffering solution satisfies the maximum cost constraint, saving the partial rebuffering solution in a set of partial rebuffering solutions for the net;
generating, by the one or more processors, a set of candidate rebuffering solutions for the net based on the set of partial rebuffering solutions;
selecting, by the one or more processors, a rebuffering solution for the net from the set of candidate rebuffering solutions; and
generating a layout instance based on the rebuffering solution selected for the net.

11. The computer-storage medium of claim 10, wherein the operations further comprise updating the database to replace the initial buffer tree in the IC design with the rebuffering solution selected for the net.

12. The computer-storage medium of claim 10, wherein:
the partial rebuffering solution is a first partial rebuffering solution; and
the operations further comprise:
generating a second rebuffering solution for the initial buffer tree;
determining a cost of the second partial rebuffering solution;
determining the cost of the second partial rebuffering solution violates the maximum cost constraint; and
based on determining the cost of the second partial rebuffering solution violates the maximum cost constraint, pruning the second partial rebuffering solution from the set of partial rebuffering solutions.

13. The computer-storage medium of claim 12, wherein generating the second partial rebuffering solution comprises inserting a buffer or inverter cell at a bufferable location within the first partial rebuffering solution.

14. The computer-storage medium of claim 10, wherein:
the net comprises a route that connects a source to a sink, and
generating a partial rebuffering solution for the net comprises:
inserting a buffer or inverter cell at a bufferable location along the route that connects the source to the sink in the net.

15. The computer-storage medium of claim 10, wherein determining the maximum cost constraint for rebuffering the initial buffer tree comprises determining a cost associated with the initial buffer tree.

16. The computer-storage medium of claim 10, wherein:
determining the cost of the initial buffer tree is based on an area consumed by cells in the initial buffer tree, leakage current associated with the cells in the initial buffer tree, and a total dynamic power of the initial buffer tree; and
determining the cost of the partial rebuffering solution is based on an area consumed by cells in the partial rebuffering solution, leakage current associated with the cells in the partial rebuffering solution, and a total dynamic power of the partial rebuffering solution.

17. The computer-storage medium of claim 10, wherein:
determining the cost of the initial buffer tree comprises calculating a sum of: an area consumed by cells in the initial buffer tree, leakage current associated with the cells in the initial buffer tree, and a total capacitance of the initial buffer tree; and
determining the cost of the partial rebuffering solution comprises calculating a sum of: an area consumed by cells in the partial rebuffering solution, leakage current associated with the cells in the partial rebuffering solution, and a total capacitance of the partial rebuffering solution.

18. A method comprising:
accessing, from a database in memory, an integrated circuit (IC) design comprising an initial buffer tree for a net in the IC design;
determining a maximum cost constraint for rebuffering the net based on the initial buffer tree;
generating a first partial rebuffering solution and second partial rebuffering solution for net;
determining a cost for the first partial rebuffering solution;
based on determining the cost of the first partial rebuffering solution satisfies the maximum cost constraint, saving the first partial rebuffering solution in a set of partial rebuffering solutions for the net;

determining a cost for the second partial rebuffering solution;

based on determining the cost of the second partial rebuffering solution violates the maximum cost constraint, pruning the second partial rebuffering solution from the set of partial rebuffering solutions for the net;

generating a set of candidate rebuffering solutions for the net based on the set of partial rebuffering solutions;

selecting a rebuffering solution for the net from the set of candidate rebuffering solutions; and updating the database to replace the initial buffer tree in the IC design with the rebuffering solution selected for the net.

19. The method of claim 18, wherein:

the maximum cost constraint comprises a cost threshold; and determining the cost of the first partial rebuffering solution satisfies the maximum cost constraint comprises:
comparing the cost of the first partial rebuffering solution to the cost threshold; and determining the cost of the first partial rebuffering solution does not exceed the cost threshold.

20. The method of claim 18, wherein:

determining the cost of the initial buffer tree is based on an area consumed by cells in the initial buffer tree, leakage current associated with the cells in the initial buffer tree, and a total dynamic power of the initial buffer tree;

determining the cost of the first partial rebuffering solution is based on an area consumed by cells in the first partial rebuffering solution, leakage current associated with the cells in the first partial rebuffering solution, and a total dynamic power of the first partial rebuffering solution; and determining the cost of the second partial rebuffering solution is based on an area consumed by cells in the second partial rebuffering solution, leakage current associated with the cells in the second partial rebuffering solution, and a total dynamic power of the second partial rebuffering solution.

* * * * *